United States Patent
Hickson et al.

(10) Patent No.: US 6,792,604 B1
(45) Date of Patent: Sep. 14, 2004

(54) INTERPROCESS COMMUNICATION MECHANISM

(75) Inventors: Andrew Ian Hickson, West Wellow (GB); Richard Scott Maxwell, Romsey (GB); Timothy Steven Raff, Fordingbridge (GB); David Ware, Downton (GB)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 09/676,994

(22) Filed: Sep. 29, 2000

(51) Int. Cl.[7] ............................................... G06F 9/46
(52) U.S. Cl. ......................................................... 719/312
(58) Field of Search ............................... 719/310, 311, 719/312–316

(56) References Cited

U.S. PATENT DOCUMENTS 5,434,975 A * 7/1995 Allen ........................... 709/312
6,049,838 A * 4/2000 Miller et al. ................. 709/315
6,161,169 A * 12/2000 Cheng ........................... 711/150
6,243,762 B1 * 6/2001 Greene et al. ............... 709/310

\* cited by examiner

*Primary Examiner*—Thomas Lee
*Assistant Examiner*—Li B. Zhen
(74) *Attorney, Agent, or Firm*—Yee & Associates, P.C.

(57) ABSTRACT

Provided are a method, computer program product and data processing apparatus for recovery from interprocess communication failures, the method comprising: in response to an initiator process requesting interprocess communication (IPC) with a responder process via an IPC link, recognizing if the initiator process does not have the expected write control of the IPC link and setting an indicator. A process other than the initiator process checks the indicator (such as after a timeout, or periodically) and, if the indicator has been set, notifies the initiator process to take control. This method avoids potential stalemate situations in which neither the initiator nor the responder process can take control, without reliance on mutex locks for every exchange of data and control.

15 Claims, 5 Drawing Sheets

INTERPROCESS COMMUNICATION MECHANISM

FIELD OF INVENTION

The present invention relates to interprocess communications (IPC), for transferring data or resource control between processes running in a data processing system or device.

BACKGROUND

There are many instances where interprocess communication (IPC) is required within a data processing system. During the operation of a resource manager computer program such as the MQSeries messaging communication manager from IBM Corporation, IPC is required for transferring data and control from one process to another, while implementing process isolation which separates a process' resources from other processes. The two processes communicating via an IPC mechanism may be, for example, an application program and a process within a resource manager program. (IBM and MQSeries are trademarks of International Business Machines Corporation.)

It is known in the art for an IPC implementation to be re-connectable—i.e. two processes A and B communicate via an IPC link and when one of these processes A has ended its communication with its communication partner process B, another process C must be able to establish a communication with the process B and this must be possible even if the previous communication ended in an uncontrolled manner (e.g. unexpected termination of process A). This ability to re-connect, or reuse the IPC mechanisms, is important since it enables a single locatable name or address to be used for all IPC conversations with a particular process (B in the above example) and avoids having to continually repeat the IPC link creation steps of allocating a shared memory block for the link and allocating any other resources such as semaphores, mutices, etc.

However, the reliance by many re-connectable IPC mechanisms on obtaining mutex locks for every data transfer via the link (to prevent resources being left in an inconsistent and unresolvable state when failures occur) entails a processing overhead which can significantly reduce processing efficiency during normal forward processing. Since most processing does not result in failures, the processing overhead of the known mechanisms for dealing with failures is undesirable and a more efficient yet still re-connectable IPC mechanism is desirable. The alternative is a non-recoverable approach which optimizes processing for the non-failure case and does not enable reuse of the same named link. This is generally unacceptable since it would allow certain failures to have a major impact on processing efficiency.

One known IPC implementation is of a flip/flop design, in which control is handed from process A to process B, process B then passes control back to process A when it has completed its task, and this then repeats. For optimal efficiency this passing of control is implemented by using a pair of semaphores, one owned by each end of the link. To pass control (which we will refer to hereafter as the baton for ease of reference) a process resets its own semaphore then posts (i.e. instructs updating of) the other process' semaphore. On being posted the second process picks up the baton and takes control, and this passing of the baton is symmetrical. The data passed between processes is held in shared memory which both processes can read and write to.

This implementation is IPC in its simplest form, but a problem with this approach is that there is a small time window between resetting one semaphore and posting the other where, effectively, neither process holds the baton. If one of the processes was to fail during this window, a new process wishing to start a conversation with the remaining process would not be able to. The problem is that neither process can take the baton in case the other process is using it, to avoid resource update inconsistencies, and since in this situation neither process has the baton we have a stalemate situation.

SUMMARY OF INVENTION

In a first aspect, the present invention provides a method for recovery from interprocess communication failures, the method comprising: in response to an initiator process requesting interprocess communication (IPC) with a responder process via an IPC link, determining whether the initiator process has write control of the IPC link and setting an indicator if the initiator process does not have said control; a process other than said initiator process checking said indicator and, in response to determining that said indicator has been set, notifying the initiator process to take said control.

The step of setting the indicator may comprise setting a token or otherwise indicating that the initiator process does not have control, so that a separate process can recognize this lack control and take appropriate action. The step of checking whether the indicator has been set is preferably implemented in response to non-establishment of interprocess communications within a preset time period;. The checking step and the step of notifying the initiator process to take control are preferably implemented by the responder process, but alternatively could be implemented by a separate process which manages the link.

The present invention addresses the problem of neither of the initiator and responder processes being able to take control of the IPC link in some circumstances, in case the other process already has control. This arises because of the requirement for atomic resource updates (i.e. updates must not leave resources in an inconsistent state) and can result in a stalemate situation. Known solutions to this problem which use mutex locking for every transfer of write control of the link during normal forward processing are too inefficient in systems which have a high communication throughput.

Using the present invention, a failure to establish communications via an IPC link, which resulted from processes having terminated when neither process has control, can be resolved by the initiator process recognizing situations in which it does not have write control of the IPC link and causing the responder process (or a separate process which manages the link) to also recognize when such situations have arisen. This avoids a potential stalemate situation without compromising the requirement for atomic updates and without reliance on mutex locking of IPC control mechanisms for every transfer of data or control.

In a preferred embodiment of the invention, a method for recovery from interprocess communication failures comprises: creating an interprocess communication (IPC) link for communications between an initiator process and a responder process, including providing a pair of tokens which are each associated with one end of said IPC link; responsive to an initiator process requesting communications via said IPC link, determining whether the initiator process has write control of the IPC link and, if not, incrementing the token associated with the initiator process' end of the link; if said request for communications is unsuccessful (for example, if communications are not established within a set time period), comparing the incremented token with the token associated with the responder process' end of the link to determine whether said tokens are synchronized; if said tokens are not synchronized, notifying the initiator process to take said control and resynchronizing said tokens.

In preferred embodiments of the invention, subsequent to comparing the tokens, the responder process relinquishes control of the link and notifies the initiator process (e.g. by posting a semaphore associated with the initiator), and then subsequently resynchronizes the tokens. The initiator process responds to the notification by taking control of the link. The reason for resynchronizing the tokens subsequent to notifying the initiator process is to avoid a problem that could otherwise occur if an initiator process identifies resynchronized tokens and starts communicating with the responder before it receives a notification from the responder, since the responder's notification to the initiator could then be mistaken for a reply to the new communication and the initiator may try to process a reply it does not have).

The setting, checking and resetting of tokens has minimal impact on processing efficiency, particularly since these steps are only implemented in the unusual situation of a requesting initiator process not having control, and so the potential stalemate situation has been avoided with far less overhead than the alternative of using mutex locks for every transfer of data or control.

In preferred embodiments of the invention, the initiator process merely increments its token to flag the discrepancy that it does not have control and then waits for either the responder or a link manager process associated with the responder to notice a discrepancy between the initiator and responder processes' tokens. This discrepancy is preferably noticed when a token comparison is performed in response to the responder or link manager process determining that a time period has expired without establishment of communications. The initiator process does not proactively attempt to obtain write control of the IPC link because such an attempt could conflict with operations performed by the responder and leave resources in an inconsistent state.

According to a preferred embodiment of the invention, one of a pair of flags is associated with each end of the IPC link for indicating which end of the link (i.e. which of the initiator and responder processes) has write control of the link, and the determination of whether the initiator process has control of the IPC link is performed by checking the respective flag at the initiator process' end of the link.

Preferably, the initiator and responder processes have a client/server relationship or a similar defined role in which multiple initiator processes can communicate with a responder process via the IPC link, but only one initiator process is attached to each link at any time and each link is associated with a single responder process. Thus, a new initiator process only attaches to the IPC link after termination of a first initiator process' communication, and the present invention solves a problem which can arise if the first initiator process terminates abnormally.

The present invention also provides a computer program, preferably recorded on a machine-readable recording medium, comprising program instructions for controlling the operation of a data processing system to perform a method as described above.

The invention also provides a data processing system including components for implementing a method as described above.

DESCRIPTION OF DRAWINGS

An embodiment of the invention will now be described in more detail, by way of example, with reference to the accompanying drawings in which.

DETAILED DESCRIPTION OF PREFERRED EMBODIMENT

Many different data processing systems and computer programs require efficient, recoverable interprocess communications (IPC). The present invention is implementable in many different data processing systems and devices and in many different types of computer program including operating system software, network communication and other resource manager software, and application programs.

As one particular example, the invention is implementable in IBM Corporation's MQSeries products and so a description of some of the features of the MQSeries products will now be provided to enable a fuller understanding of an example implementation.

Application programs running on different data processing systems within the network are enabled to communicate and hence interoperate using IBM's MQSeries communications manager products which implement message queuing communications. Message queuing and commercially available message queuing products are described in "*Messaging and Queuing Using the MQP*", B. Blakeley, H. Harris & R. Lewis, McGraw-Hill, 1994, and in the following publications which are available from IBM Corporation: "*An Introduction to Messaging and Queuing*" (IBM Document number GC33-0805-00) and "*MQSeries—Message Queue Interface Technical Reference*" (IBM Document number SC33-0850-01). The network via which the computers communicate using message queuing may be the Internet, an intranet, or any heterogeneous or homogeneous data processing network.

IBM's MQSeries messaging manager products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328, which are incorporated herein by reference.

The message queuing inter-program communication support provided by the MQSeries products enables each application program to send messages to the input queue of any other target application program and each target application can asynchronously take these messages from its input queue for processing. The communication manager component which manages queues and provides services for the assured delivery of messages between application programs, including achieving interoperability between applications in a distributed heterogeneous network, is known as a Queue Manager. The component which handles transfer of a message from an outgoing transmission queue of a sender Queue Manager across the network to an input queue of a receiver Queue Manager is known as a mover.

IBM Corporation's MQSeries product family include Queue Manager programs for a large number of different operating system and hardware platform environments, providing the messaging and queuing services to application programs through its Message Queue Interface (MQI) program calls.

In addition to the features provided within IBM's MQSeries products for communication between application programs running on different systems, interprocess communications are used for transferring data and control between processes within a single data processing system— such as between an application program and a process within the messaging manager. There may be multiple concurrent conversations running with different server processes. The relationship between two processes involved in the interprocess communication is typically of a client/server nature. Multiple application program clients can talk to each server process but only one at a time so once the first client process has ended its conversation with the server process the next client process can take up the baton (which is always held by the client at end of a successfully completed conversation) and start a new conversation. Because of this, we need to be able to recover from the situation where the previous client ends whilst not holding the baton, while preventing the above stalemate condition from occurring.

A solution has been implemented for re-synchronization of the IPC link mechanisms when a potential stalemate situation arises, without significantly impacting the efficiency of the IPC in the non-failure case.

Before describing the preferred embodiment of the IPC link re-synchronization solution in detail, the following guide to terminology is provided to aid understanding of the description of that embodiment (this guide is not intended to be a limiting definition of terms):

A Pipe is a name given to the collection of elements used in the IPC between two processes which alternately control updates to a memory block; each pipe has two ends (termini)—the client end is the initiator and the server end the responder. Under normal circumstances, the baton is held by the initiator at the start of a conversation (when an initiator attaches to the pipe). The processes send messages (data) to each other across the pipe. Until they hold the baton they cannot act on these messages.

Figure 1:
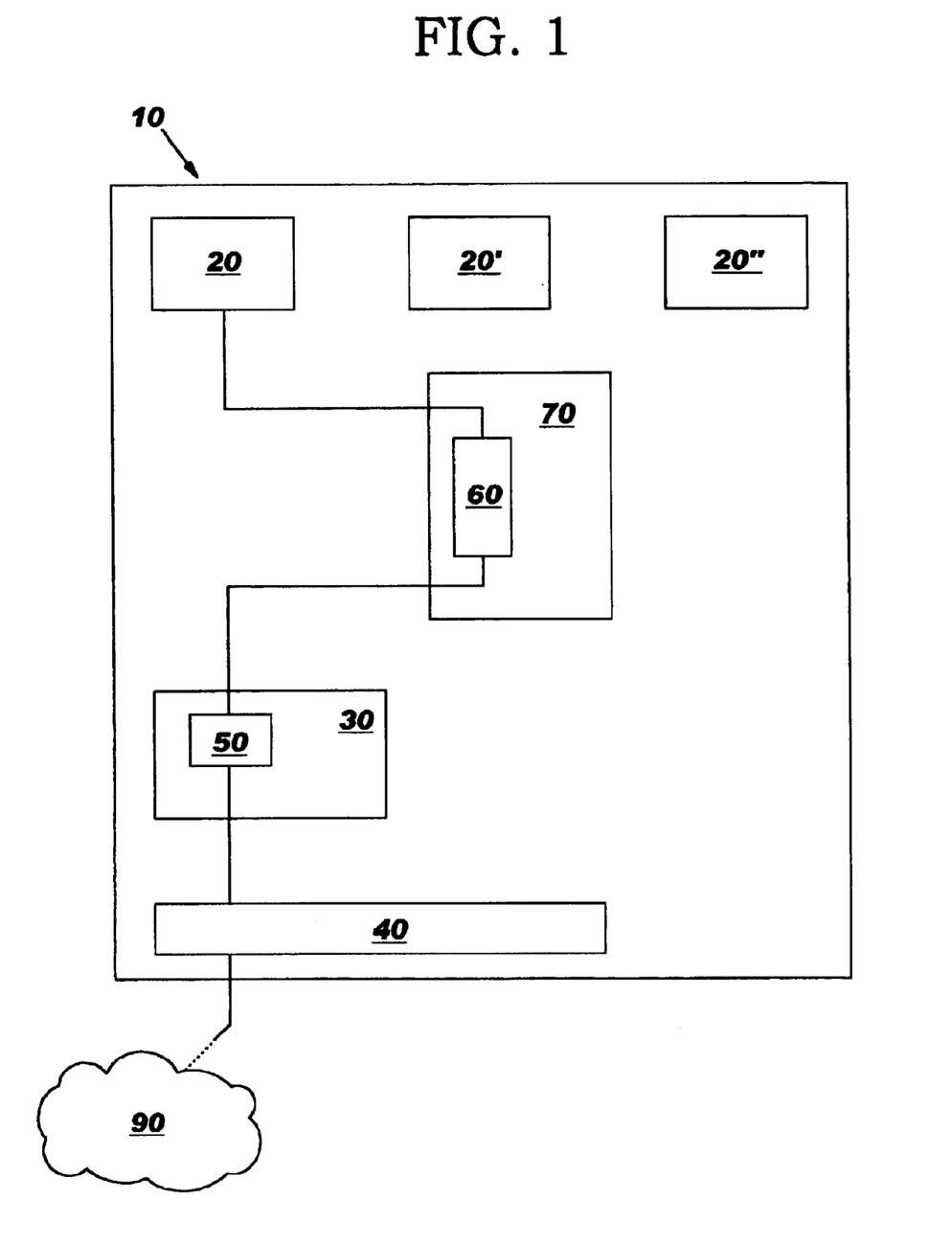
FIG. 1 is a representation of a data processing system, including software components of the system, in which the present invention is implemented.

FIG. 1 shows a data processing system 10, having a plurality of application programs 20 installed thereon. The application programs 20 connect to a communication manager program 30 which handles communications between the applications running on the system and with other application programs located elsewhere across a data processing network 90. The communication manager program 30 is supported by the system's operating system software 40. FIG. 1 shows a first application 20 communicating with a communication manager process 50 via an IPC pipe 60, which comprises an allocated block of shared memory 70.

An InterProcess Communication Component (IPCC) deals with the transfer of data between an initiator application program 20 and a responder communication manager process 50. Potentially, multiple IPC connections (links) exist at any one time, one to each of a plurality of communication manager processes.

Figure 5:
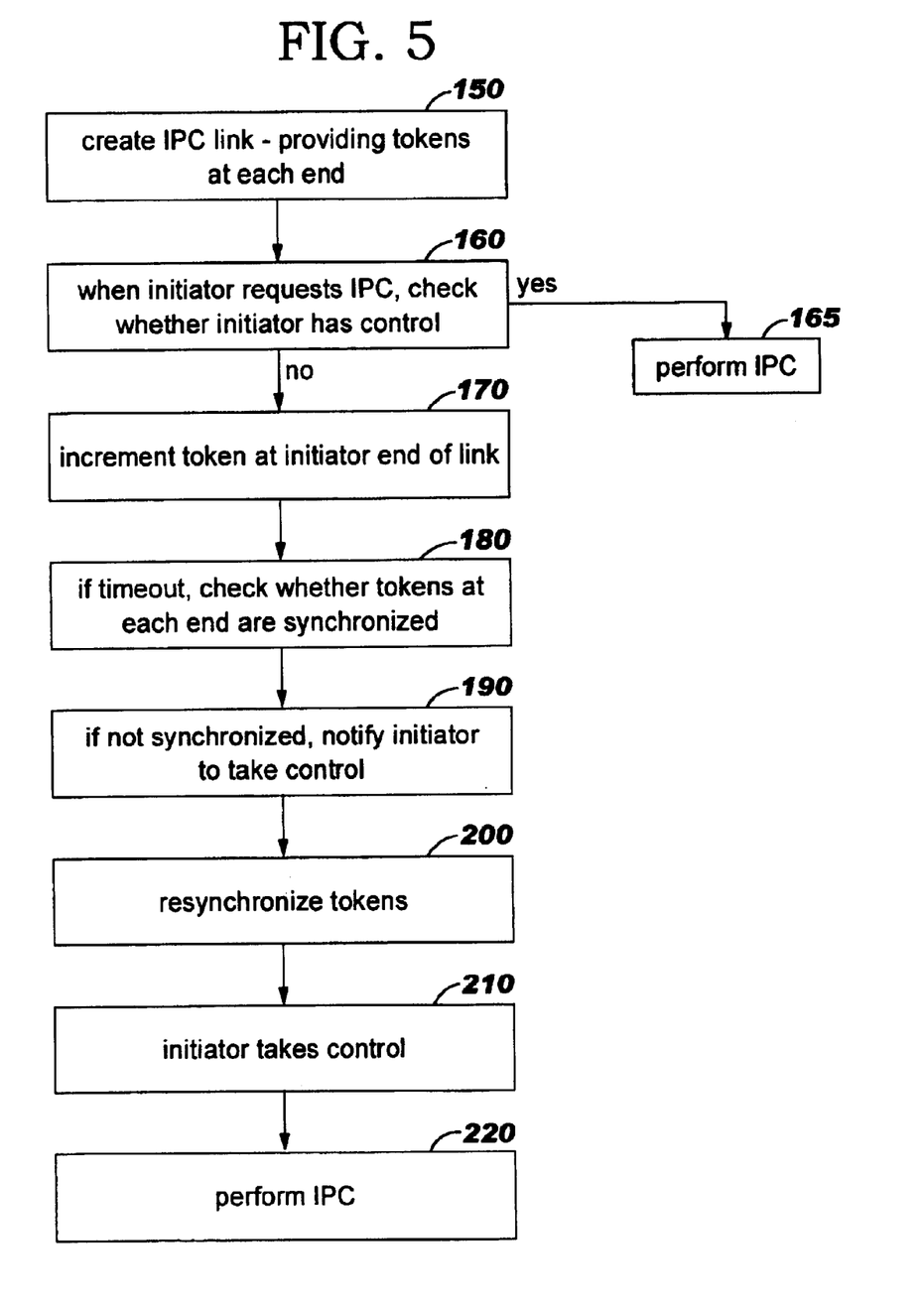
FIG. 5 is a schematic representation of the steps of a synchronization method according to an embodiment of the invention.

The basic processing flow in the absence of failures is as follows (see FIG. 5):

1. IPC links are created 150 by the communication manager, by allocating a shared memory block 60 and any other resources required, including semaphores and tokens for each end of the IPC link, and a mutex lock (or any resources required for an alternative serialization mechanism) for the initiator end of the link.

2. A communication manager process 50 connects to one end of the IPC link, and an application 20 connects to the other end such that a server/client relationship is defined between them. This involves the application finding the shared memory address of the pipe, obtaining a mutex lock for the duration of its conversation with the communication manager process, and checking 160 its baton-ownership flag to determine whether it has write access to the link.

3. Starting from the initiator end of the link, messages flow 165 in both directions between the two ends, continuously alternating the direction of message flow (see description below of flip/flop communication flow).

4. The application program 20 disconnects when its processing has completed, and the mutex lock is released.

5. Another application 20' can then attach to the IPC link and communicate with the communication manager process 50 in the same way as the first application.

6. The IPC link is deleted by the communication manager 30 when no longer required.

The IPC link is also deleted if the connected communication manager process becomes inoperable.

Figure 2:
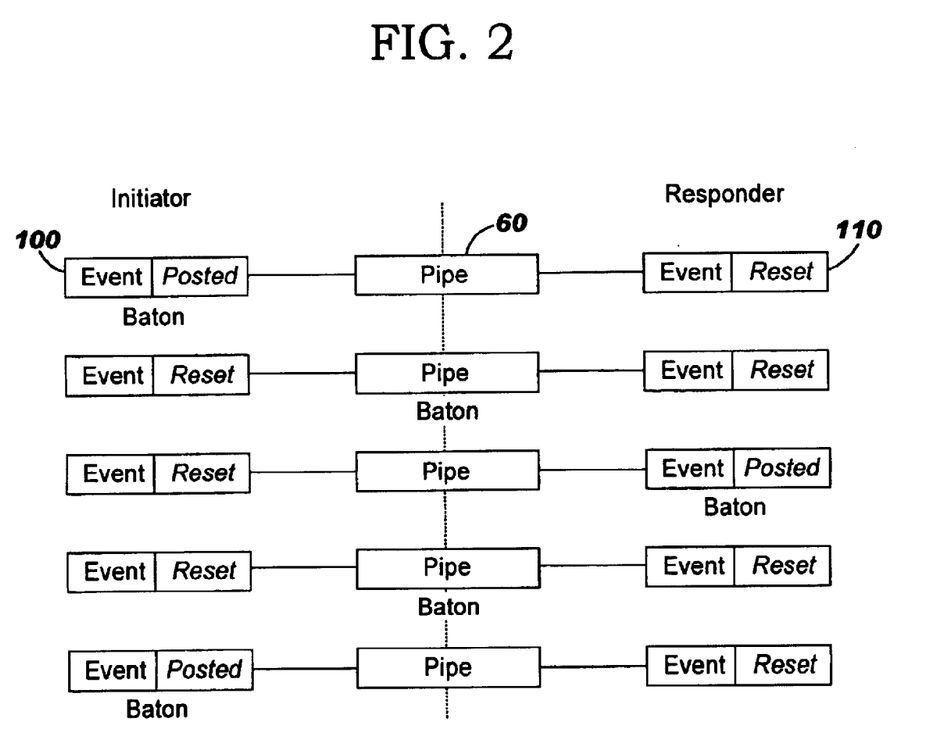
FIG. 2 is a schematic representation of the steps of passing write control to a flip/flop IPC link between an initiator and a responder process, according to an embodiment of the invention.

The IPC link is implemented as a flip flop pipe, with only two ends attached at a time (as shown in FIG. 1) instead of having multiple applications connected at one end. This is simpler to implement and has less processing overhead than if multiple applications are attached concurrently. There is never more than one active message on the pipe at a time, and the message flow always alternates from one end of the pipe to the other, never multiple sends down the pipe in the same direction in succession. This can be thought of as a baton continuously passing from one end to the other—as represented in FIG. 2. While holding the baton, a process is able to look at and alter the message (shared memory data) currently on the pipe 60. So processes never actually send a message along the pipe, but instead transfer ownership of a message, allowing the process at the other end of the communication link to look at it and alter/delete it. The pipe 60 itself is a control block that ties all these elements together. When a pipe is initially created the baton is held by the initiator terminus (the application 20 at the end of the pipe).

The method of passing the baton from one terminus to the other (send/receive on the pipe) is implemented using a pair of event semaphores 100, 110 (see FIG. 2), one belonging to each of the two termini. When a process holding the baton wishes to pass it to the other terminus, the holder resets its semaphore, making it ready to receive the baton back again, and then posts the semaphore of the other terminus, effectively one process drops the baton and notifies (posts) the other process to pick it up. On being posted, the other process can then pick up the baton, and so on. Having passed over responsibility to the process at the other end of the pipe, the first process now has no authority to alter the state of the pipe or look at any data held on it until it is handed the baton back (posted by the other end). This removes the need to ever lock the pipe itself, via a mutex, for the sake of controlling these data transfers. This significantly improves the efficiency of normal forward processing.

However, the above method does present a small window between the reset and post of the semaphores in which neither terminus holds the baton. This will only be a problem if one of the processes attached to the termini dies whilst in this window, as will be explained below.

Pipe Synchronisation

Figure 3:
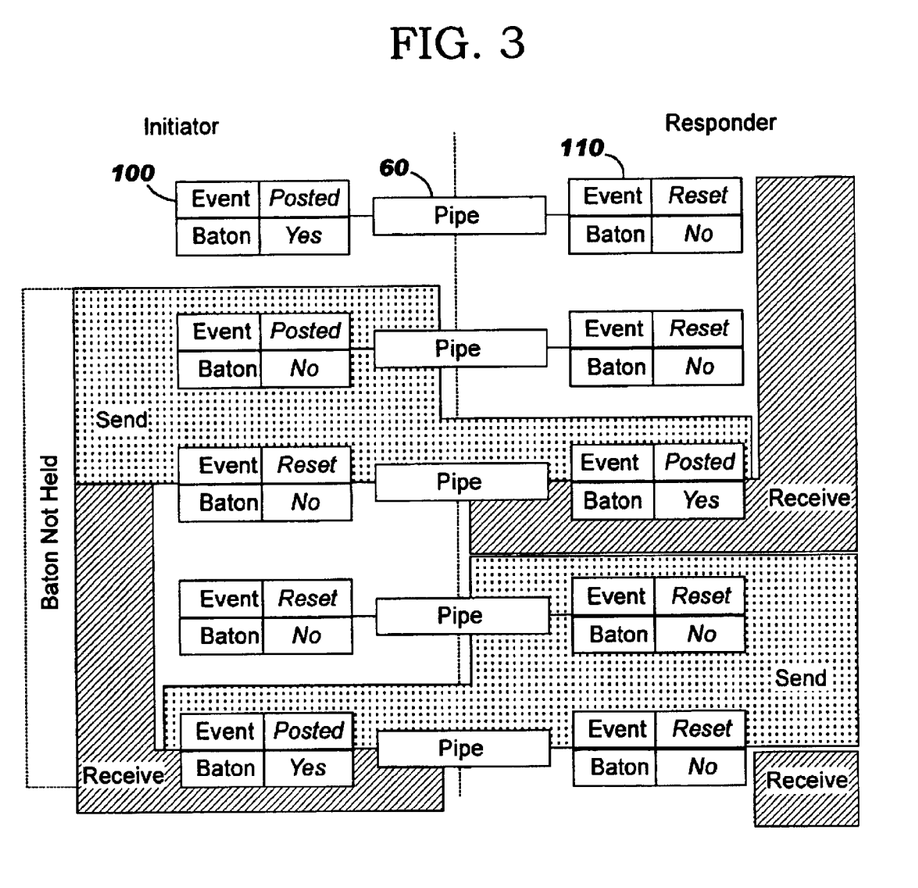
FIG. 3 is a more detailed representation of passing write control according to an embodiment of the invention.

Under normal operation an initiator will be able to pick up the baton at the time that it attaches to a pipe. There is, however, a possibility that this is will not be the case if the previously attached initiator terminated whilst it did not hold the baton. A newly attached initiator may try to attach to the IPC link when the responder still holds the baton or when neither terminus does. This will happen if the previous initiator had sent a message but the responder has not yet replied, or if the initiator terminated whilst in the time window when neither terminus holds the baton, as shown in FIG. 3.

This is only a problem if it is the initiator end (the application) that terminated abnormally, because tolerance of application failures is desired but if the responder end of the pipe (the communication manager process) is the one that terminated then the pipe is effectively unusable and will require a complete restart of the communication manager process, with the baton automatically being owned by the initiator terminus when a new link is created.

So, if an attached application process terminates whilst not holding the baton we have a case where another application can now attach to the pipe in its place, but it does not hold the baton (and possibly neither does the responder). To resolve this problem without introducing expensive mutex locking in the main line path of the pipe, a synchronisation check has been implemented. This will now be described with reference to FIGS. 4 and 5.

Figure 4:
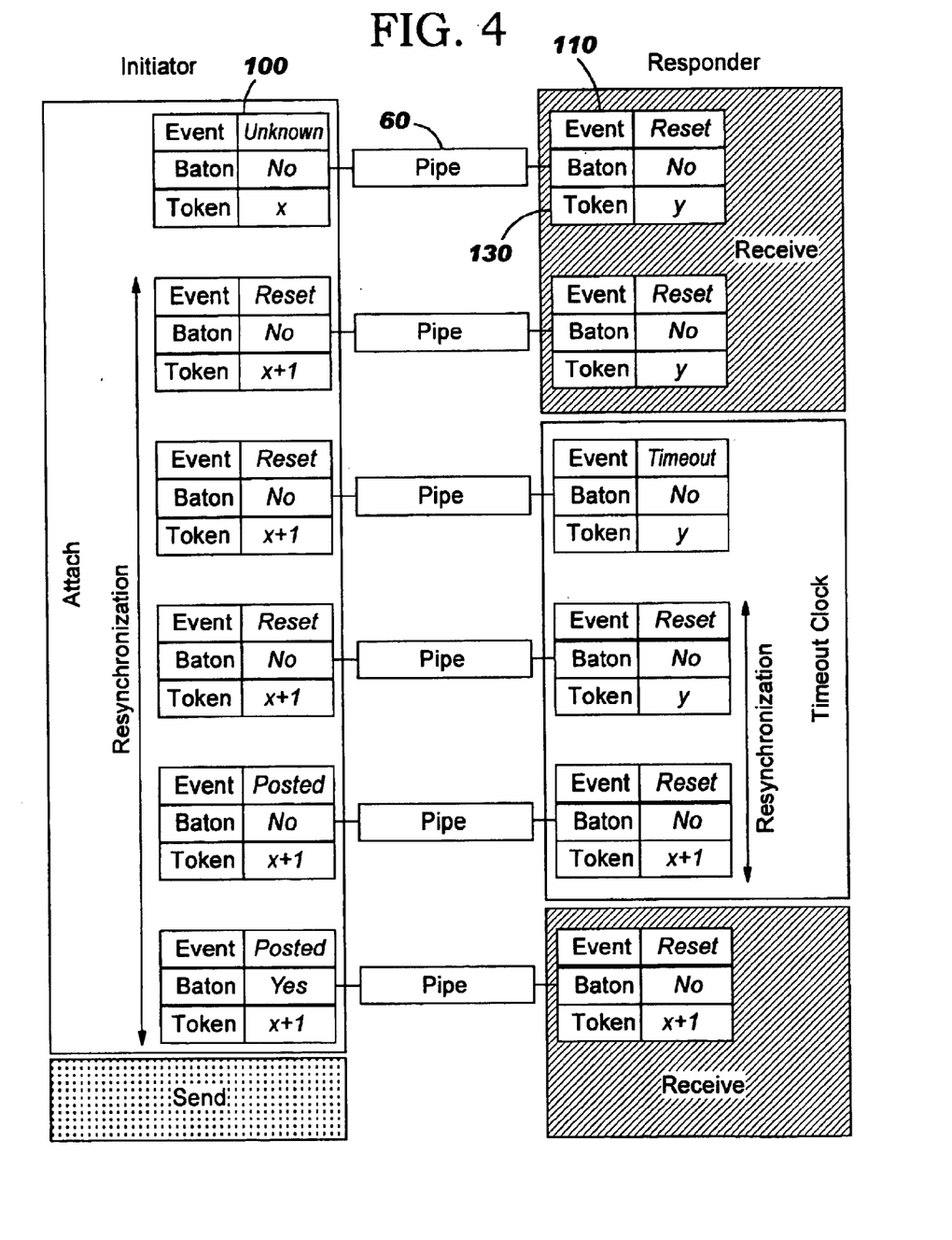
FIG. 4 shows the steps of synchronization of an IPC pipe according to an embodiment of the invention.

Firstly, an initiator realises 160 at attach time that it does not hold the baton. This is a simple case of flagging the terminus whilst it's process has the baton, and then if a process attaches and this is not flagged then it is clear that we are in this situation. As the initiator process does not necessarily own the baton at this point, it cannot safely post the responder end to tell the responder process that they are not synchronised. The potential problem with posting the responder is that the responder process could miss the post (if it still has control and resets the semaphore at this point), and so to avoid this the initiator process merely sets 170 an indicator 120 ("puts its hand up") and waits until the responder process notices 180. In the preferred embodiment, this is done by incrementing 170 one of a pair of tokens 120,130, one of which is owned by the initiator and the other owned by the responder. These tokens are normally synchronized. On the other end of the pipe the responder will be sitting there waiting to be posted once he has released the baton. The post will never happen while we are out of synchronization as the initiator is not permitted to post the responder until it knows it holds the baton, and so the responder will eventually time-out (for example, every ten seconds or so). Upon timeout, the responder can do a quick check 180 of the tokens, and if they are out of synchronization the responder now knows the baton has been lost. In the knowledge that the initiator will not do anything until we post it (and then will check the tokens for synchronisation) we can safely pick up the baton, post 190 the initiator and re-synchronize 200 the tokens. This will hand the initiator baton so that the initiator can continue 210 the communication with the knowledge that it alone holds the baton.

The tokens are not re-synchronized until after the responder has posted the initiator. Consider if this was done the other way round: the following scenario could occur. An application aborts whilst the responder holds the baton and a new application attaches to the initiator terminus in its place. The application realises the baton is not theirs and bumps its token to flag it as being out of synchronization. The responder terminus completes its operation instigated by the previous application and posts the initiator to return the baton. Before the application wakes from the post the responder happens to check the tokens for synchronisation, they are different so they re-sync tokens before posting the initiator. Before the post occurs the initiator wakes from the first post, sees the tokens synchronised and picks up the baton and carries on it way. We now have a post still to occur from the responder even though the initiator believes they hold the baton. The initiator then sends a message down the pipe and waits for the reply. At this point the responder posts the initiator as a result of the re-sync. The initiator wakes, believing the responder has processed its message and returned a reply, and goes to process it. No reply has been generated, and so the attempt to process the invalid reply leads to problems.

Therefore, the tokens are re-synchronized directly after posting the initiator. Preferably, the initiator will not get control until after we have synchronized the tokens and everything is okay (although this depends on how dispatching is handled on a particular platform). If the initiator wakes from the post and the tokens are still out of synchronization we do not know if the post was the result of an IPC conversation with the previous initiator or from a re-synchronization, so we do not bump the token yet, we just wait on the event again (with a small time-out of one second). When we awake from this wait (either a time-out or a new post) we recheck the tokens, if they are now synchronized we can carry on knowing that we hold the baton. If not, we bump the token and start again.

As mentioned above, the invention is more efficient than alternative implementations of IPC which involved obtaining a lock on the baton whilst a process held it and, on passing the baton to another process, the first process resetting its semaphore and posting the other process' semaphore. This process would then request the lock on the baton before they took control. The first process would then unlock the mutex, making it available to the second process. At this point the second process has control. This implementation was found to be too inefficient.

It should be noted that it is not a viable alternative to the invention to merely reset an IPC link each time a new initiator attaches to the link (i.e. resynchronizing tokens and resetting semaphores such that the new initiator always has control at the time it attaches). Such a reset which ignores in-progress processing could still be effected by such processing with the result that resources are left in an inconsistent state.

What is claimed is:

1. A method for recovery from interprocess communication failures, the method comprising the steps of:
   creating an interprocess communication (IPC) link for communications between an initiator process and a responder process;
   in response to an initiator process requesting interprocess communication (IPC) with a responder process via said IPC link, determining whether the initiator process has write control of the IPC link;
   if the initiator process does not have said control, setting an indicator associated with the initiator process;
   a process other than the initiator process checking said indicator and, in response to determining that said indicator has been set, notifying the initiator process to take write control of the IPC link to thereby recover from a detected interprocess communication failure.

2. A method according to claim 1, including setting a time period for establishing interprocess communications via said IPC link, wherein said process other than the initiator process checks said indicator in response to non-establishment of interprocess communications within said time period.

3. A method according to claim 1, wherein the responder process implements said steps of checking said indicator and notifying the initiator process to take write control of the IPC link.

4. A method according to claim 3, wherein, after setting said indicator, the initiator process waits until triggered by said responder process notifying it to take write control.

5. A method for recovery from interprocess communication failures, the method comprising the steps of:
   creating an interprocess communication (IPC) link for communications between an initiator process and a responder process;
   in response to an initiator process requesting interprocess communication (IPC) with a responder process via said IPC link, determining whether the initiator process has write control of the IPC link;
   if the initiator process does not have said control, setting an indicator associated with the initiator process;
   a process other than the initiator process checking said indicator and, in response to determining that said indicator has been set, notifying the initiator process to take write control of the IPC link, wherein each of said initiator and responder processes has a flag associated therewith, said flags being updated in response to a transfer of write control of the IPC link to indicate which of said initiator and responder processes has said control, and wherein the step of determining whether the initiator process has write control comprises checking the flag associated with the initiator process.

6. A method according to claim 1, wherein:
   said indicator associated with the initiator process is one of a pair of tokens and a second token of said pair is associated with the responder process;
   the step of setting said initiator process' token comprises incrementing said token such that said pair of tokens will be unsynchronized;
   the step of checking said initiator process' token comprises comparing said pair of tokens and recognizing that said tokens are unsynchronized; and
   the method further comprises the step of resynchronizing said pair of tokens subsequent to the step of notifying the initiator process to take said control.

7. A method according to claim 6, wherein the initiator process takes control subsequent to the step of resynchronizing said pair of tokens.

8. A method according to claim 1, wherein the IPC link is adapted to enable a second initiator process to attach to said IPC link only after a first initiator process' attachment to the link has terminated.

9. A method for recovery from interprocess communication failures comprising:
   creating an interprocess communication (IPC) link for communications between an initiator process and a responder process, including providing a pair of tokens which are each associated with one end of said IPC link;
   setting a time period for the establishment of interprocess communications via said IPC link;
   responsive to an initiator process requesting communications via said IPC link, determining whether the initiator process has write control of the IPC link and, if not, incrementing the token associated with the initiator process' end of the link;
   in response to non-establishment of interprocess communications within said set time period, comparing the incremented token with the token associated with the responder process' end of the link to determine whether said tokens are synchronized;
   if said tokens are not synchronized, notifying said initiator process to take write control of the link and resynchronizing said tokens.

10. A computer program product comprising machine readable computer program code recorded on a recording medium, the program code including instructions for controlling operations of a data processing apparatus to implement a method for performing the steps recited in claim 1.

11. A data processing apparatus comprising:
    means for creating an interprocess communication (IPC) link for communications between an initiator process and a responder process when installed on the data processing apparatus;
    means, responsive to an initiator process requesting interprocess communication (IPC) with a responder process via an IPC link, for determining whether the initiator process has write control of the IPC link;
    means for setting an indicator associated with the initiator process if the initiator process does not have said control;
    means, separate from said initiator process, for checking said indicator and, in response to recognizing that said indicator has been set, for notifying the initiator process to take write control of the IPC link to thereby recover from a detected interprocess communication failure.

12. A method according to claim 1, wherein the detected interprocess communication failure is a stalenate between the initiator process and the responder process.

13. A data processing apparatus according to claim 11, wherein the detected interprocess communication failure is stalenate between the initiator process and the responder process.

14. A method according to claim 1, wherein the IPC link is a flip/flop pipe with two ends attached at a time, and at most, one active message on the pipe at a time.

15. A method according to claim 1, wherein said indicator associated with the initiator process is one of a pair of tokens and a second token of said pair is associated with the responder process, and wherein each token of the pair is used to control both reading and writing by its associated process.

* * * * *

UNITED STATES PATENT AND TRADEMARK OFFICE
CERTIFICATE OF CORRECTION

PATENT NO. : 6,792,604 B1
DATED : September 14, 2004
INVENTOR(S) : Andrew Ian Hickson et al.

It is certified that error appears in the above-identified patent and that said Letters Patent is hereby corrected as shown below:

Column 10,
Line 32, after "for" delete "performing the steps recited in claim 1" and insert
-- recovery from interprocess communication failures, the method comprising:

creating an interprocess communication (IPC) link for communications between an initiator process and a responder process;

in response to an initiator process requesting interprocess communication (IPC) with a responder process via said IPC link, determining whether the initiator process has write control of the IPC link;

if the initiator procees does not have said control, setting an indicator associated with the initiator process;

A process other than the initiator process checking said indicator and, in response to determining tat said indicator has been set, notifying the initiator process to take write control of the IPC link to thereby recover from a detected interprocess communication failure. --
Line 51, after "a" delete "stalenate" and insert -- stalemate --.
Line 55, before "between" delete "stalenate" and insert -- a stalemate --.

Signed and Sealed this

Twenty-fourth Day of May, 2005

JON W. DUDAS
*Director of the United States Patent and Trademark Office*